US010907703B2

(12) United States Patent
Tomatsu

(10) Patent No.: US 10,907,703 B2
(45) Date of Patent: Feb. 2, 2021

(54) GEAR TRANSMISSION DEVICE AND IMAGE FORMING APPARATUS

(71) Applicant: BROTHER KOGYO KABUSHIKI KAISHA, Nagoya (JP)

(72) Inventor: Yoshiya Tomatsu, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/578,456

(22) Filed: Sep. 23, 2019

(65) Prior Publication Data

US 2020/0103006 A1 Apr. 2, 2020

(30) Foreign Application Priority Data

Sep. 28, 2018 (JP) ................... 2018-183190

(51) Int. Cl.
*F16H 3/66* (2006.01)
*F16H 3/20* (2006.01)
*G03G 15/06* (2006.01)
*G03G 15/00* (2006.01)
*G03G 21/16* (2006.01)

(52) U.S. Cl.
CPC ............. *F16H 3/666* (2013.01); *F16H 3/20* (2013.01); *G03G 15/06* (2013.01); *G03G 15/757* (2013.01); *G03G 21/1647* (2013.01); *F16H 2200/20* (2013.01)

(58) Field of Classification Search
CPC ........ F16H 3/666; F16H 3/20; F16H 2200/20; G03G 15/06; G03G 15/757; G03G 21/1647; G03G 2221/16; B41J 29/38
See application file for complete search history.

(56) References Cited

U.S. PATENT DOCUMENTS

| 4,714,388 A | * | 12/1987 | Siler | ...................... | B23Q 5/385 |
| | | | | | 409/174 |
| 4,941,762 A | * | 7/1990 | Murakami | ............. | B41J 23/025 |
| | | | | | 400/636.1 |
| 5,220,370 A | * | 6/1993 | Hawai | .................. | G03B 17/425 |
| | | | | | 318/558 |
| 2014/0020489 A1 | | 1/2014 | Nozaki et al. | | |

FOREIGN PATENT DOCUMENTS

| JP | 2010-053948 A | | 3/2010 | | |
| JP | 2012234073 A | * | 11/2012 | ............... | F16H 1/28 |
| JP | 2014-021378 A | | 2/2014 | | |

* cited by examiner

*Primary Examiner* — Tisha D Lewis
(74) *Attorney, Agent, or Firm* — Scully, Scott, Murphy & Presser, PC

(57) ABSTRACT

A gear transmission device includes a frame, a sun gear, a driven gear, a planetary gear, a contact member, and a guide. The guide guides the contact member as described below. When the planetary gear is at a meshing position, a first tooth portion and a first contact portion of the contact member are away from the planetary gear. When the planetary gear is at a farthest position, the first contact portion is in contact with the planetary gear and the first tooth portion is away from the planetary gear. When the planetary gear is between the meshing position and the farthest position, the first tooth portion moves in mesh with the planetary gear in a direction opposite to a moving direction of the planetary gear around the sun gear, and the first contact portion is switched between a state in contact with the planetary gear and a state away from the planetary gear.

16 Claims, 11 Drawing Sheets

GEAR TRANSMISSION DEVICE AND IMAGE FORMING APPARATUS

CROSS-REFERENCE TO RELATED APPLICATION

This application claims priority from Japanese Patent Application No. 2018-183190 filed on Sep. 28, 2018, the content of which is incorporated herein by reference in its entirety.

TECHNICAL FIELD

The disclosure relates to a gear transmission device and an image forming apparatus.

BACKGROUND

A known pendulum gear mechanism, which is an example of a gear transmission device, includes a pendulum gear configured to mesh with a drive gear and move around the drive gear. A mounting plate supports the drive gear rotatably about an axis and the pendulum gear rotatably about an axis parallel with the axis of the drive gear. A coil spring is disposed between the mounting plate and the pendulum gear and always urges the pendulum gear toward the mounting plate. A friction force exerted, by the coil spring, between the mounting plate and the pendulum gear allows the pendulum gear to move in a rotation direction of the drive gear.

SUMMARY

In the above known pendulum gear mechanism as an example of a gear transmission device, a friction force, which is always exerted, by the coil spring, on the pendulum gear, may always affect the drive load.

Accordingly, one or more aspects of the disclosure provide a gear transmission device and an image forming apparatus which are configured to reduce the drive load.

According to an aspect of the disclosure, a gear transmission device includes a frame, a sun gear supported by the frame rotatably about a first axis, a driven gear rotatably supported by the frame and spaced from the sun gear, a planetary gear supported by the frame rotatably about a second axis and movably around the sun gear between a meshing position and a farthest position, a contact member, and a guide formed in the frame and configured to guide the contact member. The planetary gear at the meshing position is in mesh with the driven gear, and the planetary gear at the farthest position is spaced farthest from the driven gear. The contact member includes a first tooth portion configured to mesh with the planetary gear, and a first contact portion configured to contact the planetary gear. The guide is configured to guide the contact member as described below. When the planetary gear is at the meshing position, the first tooth portion and the first contact portion are away from the planetary gear. When the planetary gear is at the farthest position, the first contact portion is in contact with the planetary gear and the first tooth portion is away from the planetary gear. When the planetary gear is between the meshing position and the farthest position, the first tooth portion moves in mesh with the planetary gear in a direction opposite to a moving direction of the planetary gear around the sun gear, and the first contact portion is switched between a state in contact with the planetary gear and a state away from the planetary gear.

According to another aspect of the disclosure, an image forming apparatus includes the above-described gear transmission device, and an image forming unit configured to form an image on a sheet.

DETAILED DESCRIPTION

Embodiments of the disclosure will now be described with reference to the drawings.

Embodiments

Figure 1:
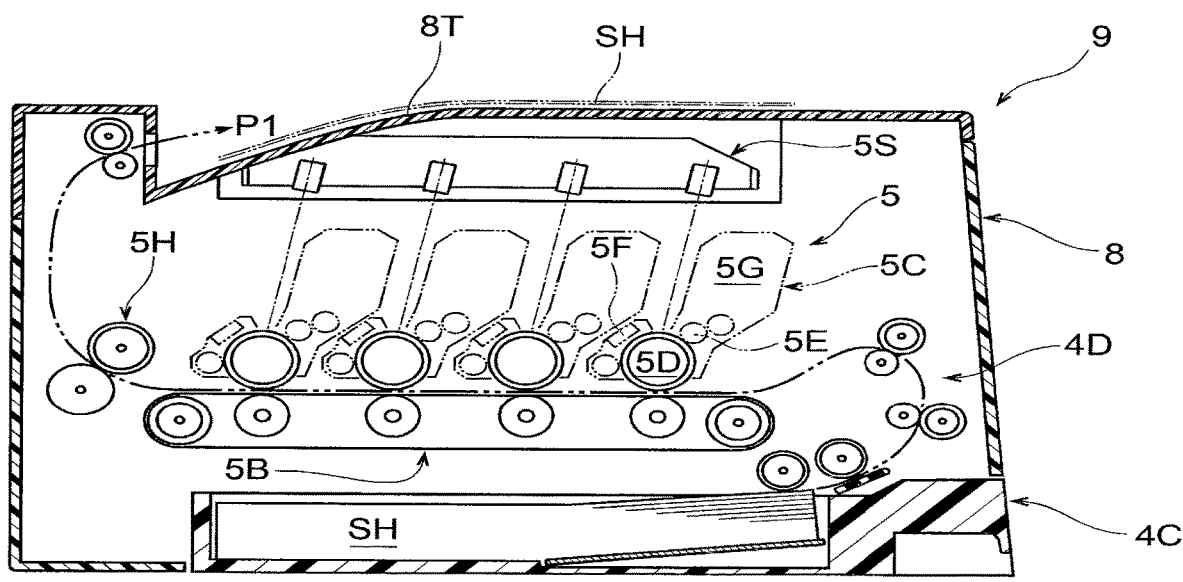
FIG. 1 is a schematic cross-sectional view of an image forming apparatus including a gear transmission device according to an embodiment.

FIG. 1 shows an image forming apparatus 9 according to an embodiment. The image forming apparatus 9 includes a gear transmission device 1, shown in FIG. 2, according to an embodiment.

Overall Structure of Image Forming Apparatus

As shown in FIG. 1, the image forming apparatus 9 includes a housing 8, a sheet cassette 4C, and a transport mechanism 4D, and an image forming unit 5.

The sheet cassette 4C is disposed at the bottom of the housing 8. The sheet cassette 4C stores therein a stack of sheets SH. The transport mechanism 4D picks up a sheet SH at a time, and transports the sheet along a substantially S-shaped transport path P1, and discharges the sheet onto a discharge tray 8T disposed on an upper surface of the housing 8.

The image forming unit 5 is disposed above the sheet cassette 4C, in the housing 8. The sheet SH transported by the transport mechanism 4D passes through the image forming unit 5 along a substantially horizontal portion of the transport path P1.

The image forming unit 5 is of the direct tandem type capable of color printing. The image forming unit 5 includes developer cartridges 5C, a transfer belt 5B, a scanning unit 5S, and a fixing unit 5H.

The developer cartridges 5C include four cartridges of black, yellow, magenta, and cyan toner and are arranged in series along the substantially horizontal portion of the transport path P1. Each developer cartridge 5C includes a photosensitive drum 5D and further includes, around the photosensitive drum 5D, a developing roller 5E, a charger 5F, and a toner container 5G.

The transfer belt 5B is disposed below the photosensitive drums 5D to define therebetween the substantially horizontal portion of the transfer path P1. The transfer belt 5B circulates while pinching, in conjunction with the photosensitive drums 5D, a sheet being transported.

The scanning unit 5S includes laser emitters, polygon mirrors, lenses, and reflecting mirrors. The scanning unit 5S irradiates the photosensitive drum 5D of each developer cartridge 5C with a corresponding black, yellow, magenta, or cyan laser beam.

A heat roller and a pressure roller of the fixing unit 5H heats and presses a sheet SH having passed below the developer cartridges 5C.

The thus structured image forming unit 5 forms an image on a sheet SH, as described below. In each developer cartridge 5C, after the charger 5F uniformly and positively charges the surface of the photosensitive drum 5D, the scanning unit 5S irradiates the surface of the photosensitive drum 5D. Thus, an electrostatic latent image, which corresponds to an image to be formed on the sheet SH, is formed on the surface of the photosensitive drum 5D. Subsequently, the developing roller 5E supplies toner contained in the toner container 5G to the surface of the photosensitive drum 5D, in accordance with the electrostatic latent image. The toner retained on the surface of the photosensitive drum 50 is transferred to the sheet SH. The fixing unit 5H heats and presses the sheet SH with the transferred toner image. The transfer mechanism 4D discharges the sheet SH with the fixed toner image onto the discharge tray 8T.

Figure 3:
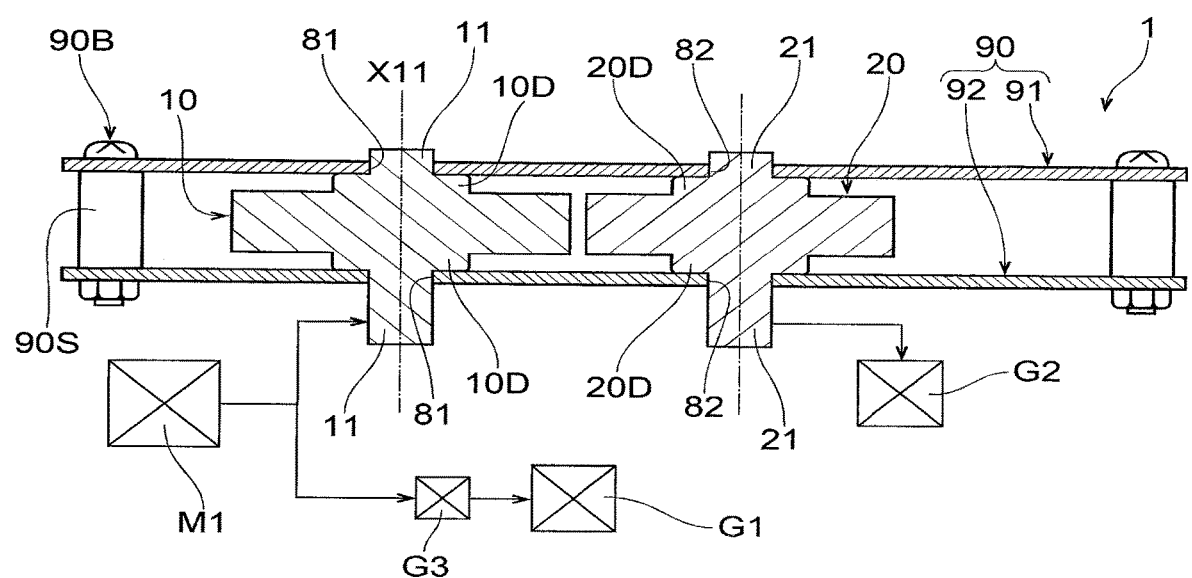
FIG. 3 is a cross-sectional view of the gear transmission device taken along line A-A of FIG. 2.

The image forming apparatus 9 is configured to perform color printing and monochrome printing, as described below. As schematically shown in FIG. 3, the housing 8 houses therein a drive source M1, a first transmitter G1, a second transmitter G2, a gear transmission device 1, and a rotation direction adjusting mechanism G3.

The drive source M1 rotates in forward and reverse directions to generate a force for driving the image forming unit 5. The first transfer G1 includes a gear and a transmission shaft and is connected to the developing roller 5E. The first transfer G2 includes gears and transmission shafts and is connected to the developing rollers 5E for yellow, magenta, and cyan colors. The gear transmission device 1 is disposed between the drive source M1 and the second transmitter G2.

The rotation direction adjusting mechanism G3 is disposed between the drive source M1 and the first transmitter G1. When the drive source M1 rotates in the forward and reverse directions, the rotation direction adjusting mechanism G3 transmits a drive force of the drive source M1 to the first transmitter G1 in a predetermined direction regardless of whether the drive source M1 rotates in the forward or reverse direction.

For example, the rotation direction adjusting mechanism G3 may include a pendulum gear mechanism connected to the drive source M1, and a first output gear chain and a second output gear chain which are connected in parallel to the first transmitter G1. In this case, when the drive source M1 rotates in the forward direction, the pendulum gear mechanism is connected to the first output gear chain and is released from the second output gear chain, and the first gear chain transmits a drive force of the drive source M1 in a predetermined direction to the first transmitter G1. In contrast, when the drive source M1 rotates in the reverse direction, the pendulum gear mechanism is released from the first output gear chain and is connected to the second output gear chain, and the second gear chain transmits the drive force of the drive source M1 in the predetermined direction to the first transmitter G1.

When the image forming apparatus 9 performs color printing, the drive source M1 rotates in the forward direction. The gear transmission device 1 transmits a drive force of the drive source M1 to the first transmitter G1 via the rotation direction adjusting mechanism G3. In addition, as described in detail below, the gear transmission device 1 transmits the drive force of the drive source M1 to the second transmitter G2 such that all the developing rollers 5E rotate.

In contrast, when the image forming apparatus 9 performs monochrome printing, the drive source M1 rotates in the reverse direction. The gear transmission device 1 transmits a drive force of the drive source M1 to the first transmitter G1 via the rotation direction adjusting mechanism G3. However, as described in detail below, the gear transmission device 1 blocks transmission of the drive force from the drive source M1 to the second transmitter G2. Thus, only the developing roller 5E for the black color rotates.

Structure of Gear Transmission Device

As shown in FIGS. 2-11, the gear transmission device 1 includes a frame 90, a sun gear 10, a driven gear 20, a planetary gear 30, a first guide 50, a second guide 60, and a contact member 40. The first guide 50 and a second guide 60 are each an example of a guide.

Figure 2:
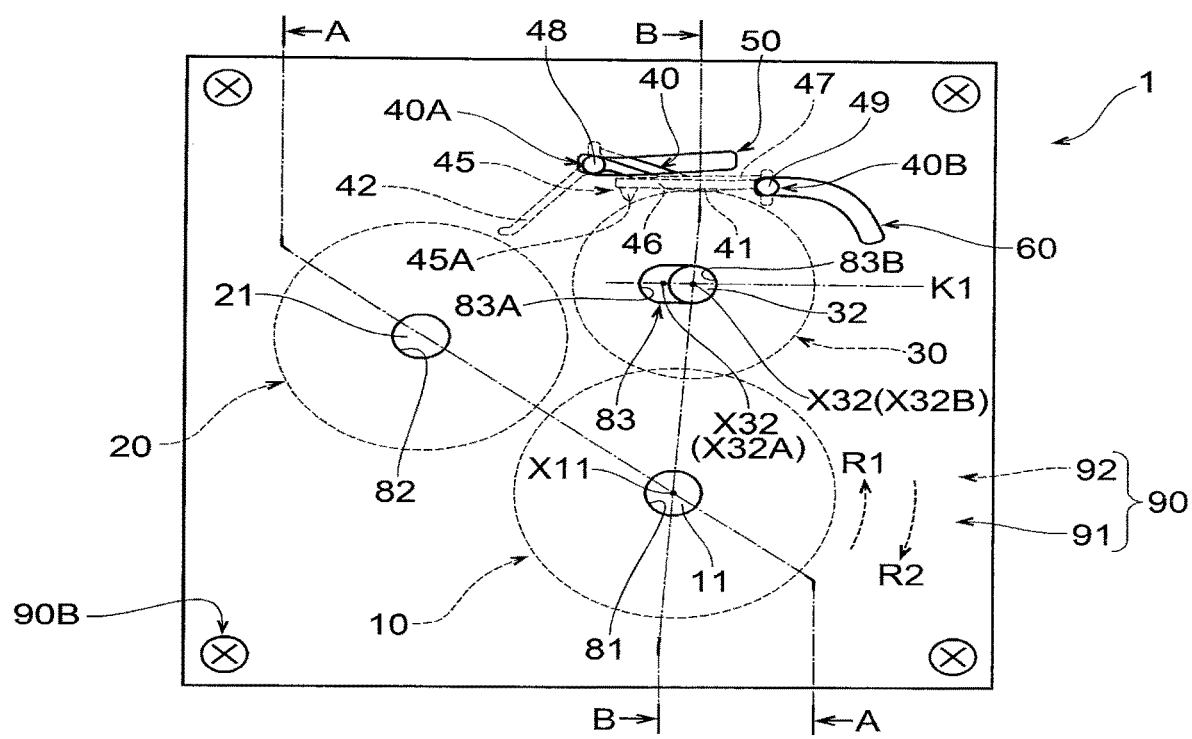
FIG. 2 is a plan view of the gear transmission device.

As shown in FIGS. 2 and 3, the frame 90 includes a first frame 91 and a second frame 92. Each of the first frame 91 and the second frame 92 is a substantially rectangular flat plate. The first frame 91 and the second frame 92, which are simplified in shape in this embodiment, may have a larger size to support mechanical elements other than the gear transmission device 1, and may have a more complex shape including holes and bends.

The first frame 91 and the second frame 92 face each other and extend in parallel to each other by being fastened via a spacer 90S by a screw and a nut at each of their four corners.

Figure 5:
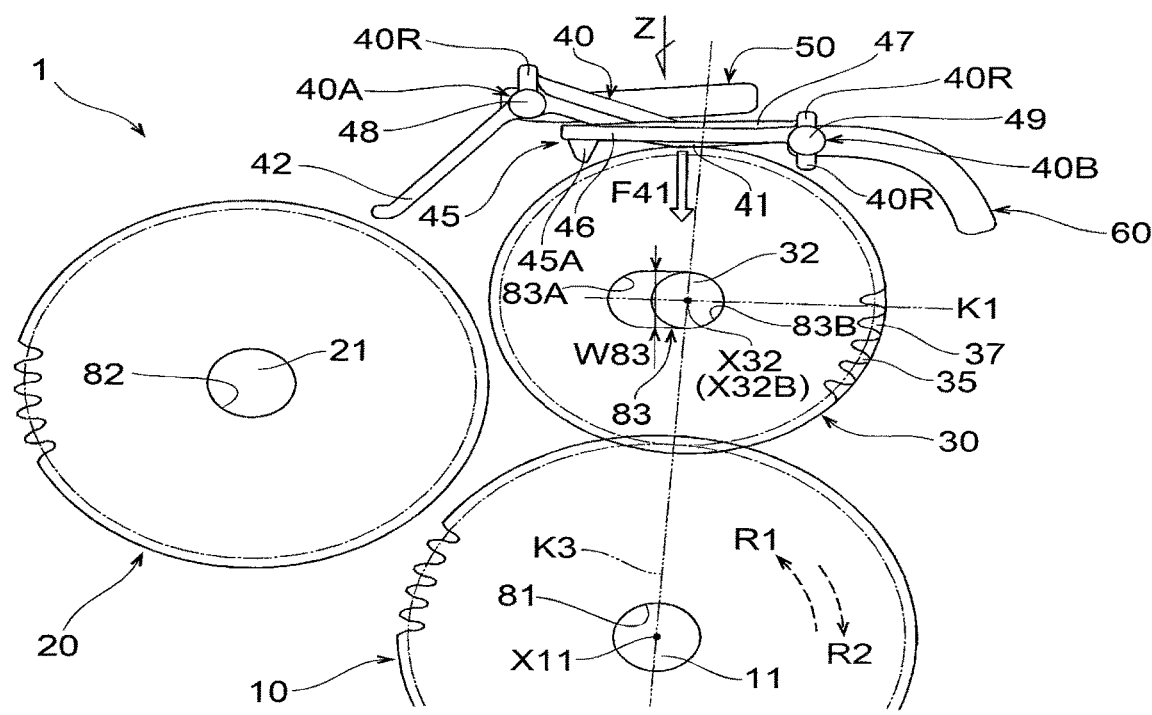
FIG. 5 is a schematic partial front view of the gear transmission device including a sun gear, a driven gear, a planetary gear at a farthest position, a planetary gear guide, a contact member, a first guide, and a second guide.

As schematically shown in FIG. 5, the sun gear 10 and the driven gear 20 are spur gears.

As shown in FIG. 3, a first shaft 11 is integral with the sun gear 10. The first shaft 11 is a cylindrical shaft extending in a direction in which the first frame 91 and the second frame 92 face each other. A first axis X11 is defined at the center of the first shaft 11.

The first shaft 11 protrudes from opposite sides of the sun gear 10 toward the first frame 91 and the second frame 92. The first shaft 11 is inserted in each shaft hole 81 formed in the first frame 91 and the second frame 92 such that the sun gear 10 is supported by the frame 90 rotatably about the first shaft 11.

The sun gear 10 includes a step portion 10D on each of a side surface thereof facing the first frame 91 and a side surface thereof facing the second frame 92. Each step portion 10D surrounds the first shaft 11. The step portions 10D face the first frame 91 and second frame 92, respectively while leaving a small clearance, thereby preventing the sun gear 10 from rattling in a direction along the first shaft 11.

A portion of the first shaft 11 penetrates through the shaft hole 81 in the second frame 92 to extend in a direction away from the first frame 91, and is connected to the developing roller M1. When a drive force of the drive source M1 rotating in the forward direction is transmitted to the first shaft 11, the sun gear 10 is configured to rotate in a first direction R1 shown in at least FIG. 5. The first direction R1 is a clockwise direction, as shown in at least FIG. 5. In contrast, when a drive force of the drive source M1 rotating in the reverse direction is transmitted to the first shaft 11, the sun gear 10 is configured to rotate in a second direction R2 shown in at least FIG. 5. The second direction R2 is opposite to the first direction R1.

As shown in FIGS. 2 and 3, the driven gear 20 is spaced from the sun gear 10. As shown in FIG. 3, a rotation shaft 21 is integral with the driven gear 20. The rotation shaft 21 is a cylindrical shaft extending in parallel with the first shaft 11.

The rotation shaft 21 protrudes from opposite sides of the driven gear 20 toward the first frame 91 and the second frame 92. The rotation shaft 21 is inserted in each shaft hole 82 formed in the first frame 91 and the second frame 92 such that the driven gear 20 is supported by the frame 90 rotatably about the rotation shaft 21.

The driven gear 20 includes a step portion 20D on each of a side surface thereof facing the first frame 91 and a side surface thereof facing the second frame 92. Each step portion 20D surrounds the rotation shaft 21. The step portions 20D face the first frame 91 and second frame 92, respectively while leaving a small clearance, thereby preventing the driven gear 20 from rattling in the direction along the first shaft 11.

A portion of the rotation shaft 21 penetrates through the shaft hole 82 in the second frame 92 to extend in a direction away from the first frame 91, and is connected to the second transmitter G2.

Figure 4:
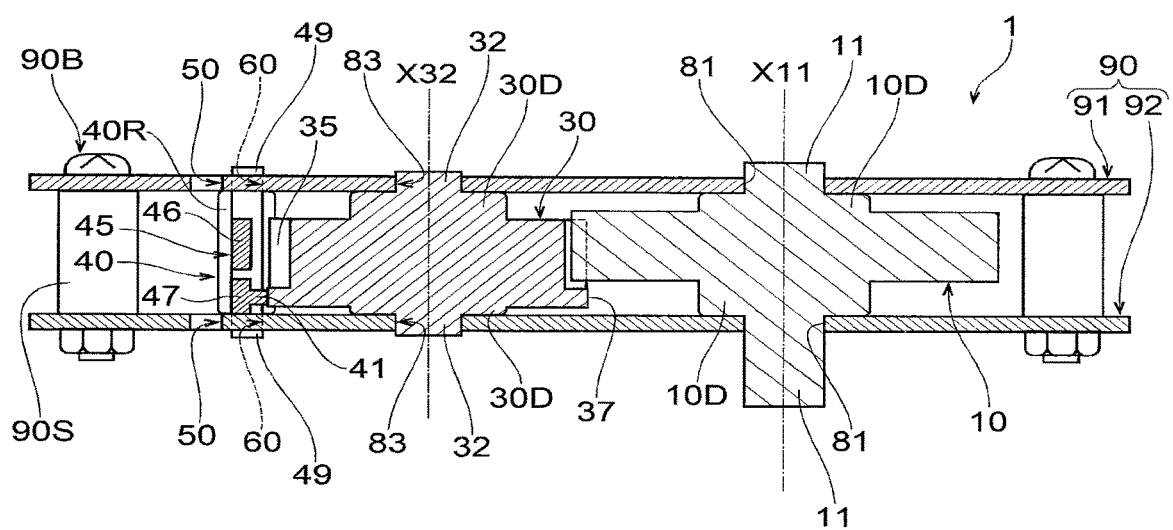
FIG. 4 is a cross-sectional view of the gear transmission device taken along line B-B of FIG. 2.

As shown in FIG. 4, a second shaft 32 is integral with the planetary gear 30. The second shaft 32 is a cylindrical shaft extending in parallel with the first shaft 11. A second axis X32 is defined at the center of the second shaft 32.

The second shaft 32 protrudes from opposite sides of the planetary gear 30 toward the first frame 91 and the second frame 92. The second shaft 32 is inserted in a planetary gear guide 83 formed in each of the first frame 91 and the second frame 92.

As shown in FIG. 5, the planetary gear guide 83 is a slot extending in an arc about the first axis X11. The inside distance W83 of the planetary gear guide 83 in a radial direction about the first axis X11 is set to be greater than the outside diameter of the second shaft 32.

One end 83A of the planetary gear guide 83 in a circumferential direction about the first axis X11 is closer to the driven gear 20 than the other end 83B of the planetary gear guide 83 in the circumferential direction.

The second shaft 32 is inserted in each planetary gear guide 83 such that the planetary gear 30 is supported by the frame 90 rotatably about the second shaft 32 and movably around the sun gear 10.

As shown in FIG. 4, the planetary gear 30 includes a step portion 30D on each of a side surface thereof facing the first frame 91 and a side surface thereof facing the second frame 92. Each step portion 30D surrounds the second shaft 32. The step portions 30D face the first frame 91 and second frame 92, respectively while leaving a small clearance, thereby preventing the planetary gear 30 from rattling in the direction along the first shaft 11.

Figure 7:
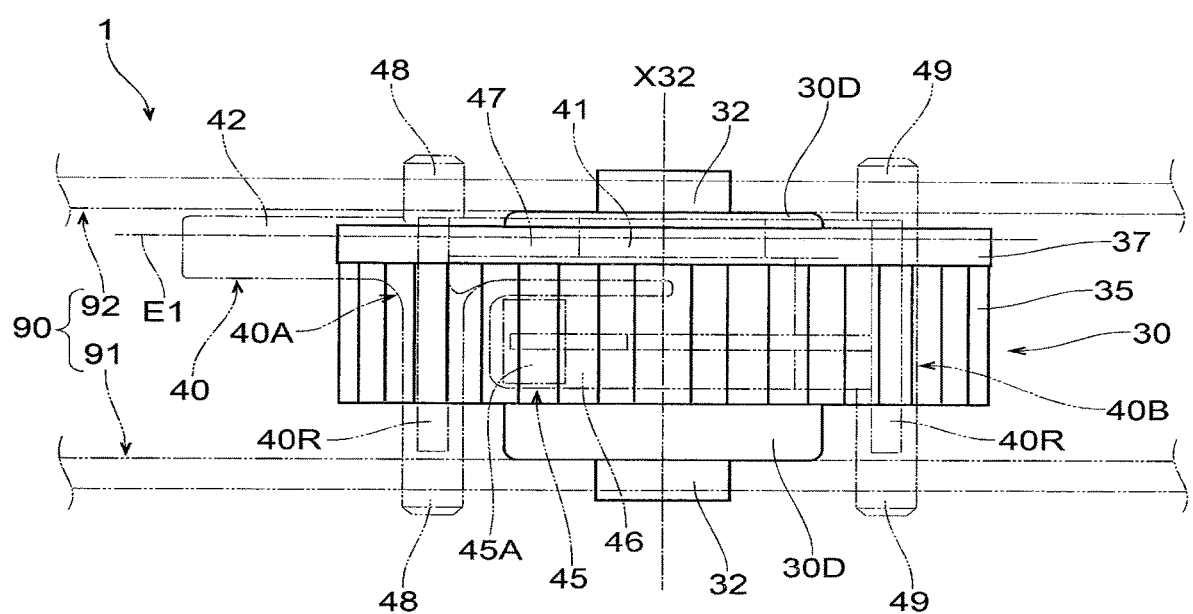
FIG. 7 is a schematic partial top view of the planetary gear and the contact member when viewed in a direction of arrow Z in FIG. 5.

As shown in FIGS. 4, 5, and 7, the planetary gear 30 includes a second tooth portion 35 and a flange 37. The second tooth portion 35 is a spur gear including a plurality of teeth arranged in a circumferential direction about the second shaft 32. The second tooth portion 35 is formed entirely around the circumference of the planetary gear 30. The flange 37 has a flat surface formed in the circumferential direction about the second shaft 32. The flange 37 is located closer to the second frame 92 than the second tooth portion 35 and is rotatable integrally with the second tooth portion 35. The outside diameter of the flange 37 is slightly greater than the outside diameter of the second tooth portion 35.

The second tooth portion 35 of the planetary gear 30 is always in mesh with the sun gear 10 regardless of the movement of the planetary gear 30 about the first shaft 11.

As shown in FIG. 5, when the second shaft 32 is stopped at the other end 83B of the planetary gear guide 83, the planetary gear 30 is farthest from the driven gear 20. The planetary gear 30 shown in FIG. 5 is located at a farthest position from the driven gear 20. The planetary gear 30 shown in FIG. 2 is also located at the farthest position from the driven gear 20.

Figure 6:
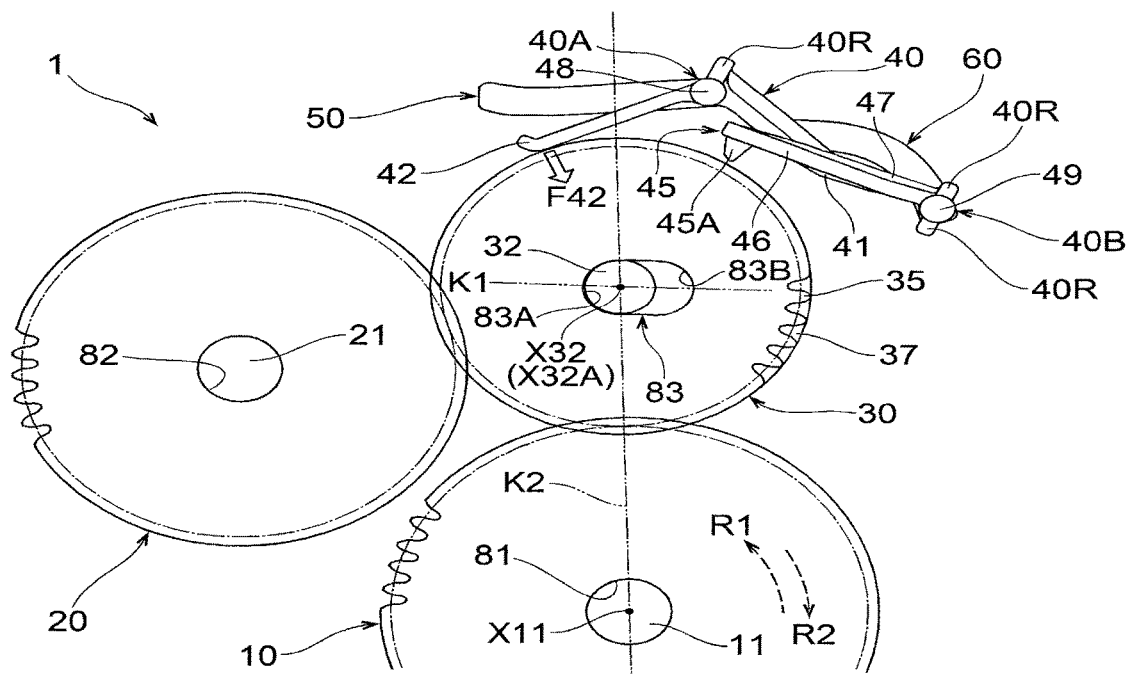
FIG. 6 is a schematic partial front view of the gear transmission device including the sun gear, the driven gear, the planetary gear at a meshing position, the planetary gear guide, the contact member, the first guide, and the second guide.

As shown in FIG. 6, when the second shaft 32 is stopped at one end 83A of the planetary gear guide 83, the planetary gear 30 is in mesh with the driven gear 20 in a proper depth. The planetary gear 30 shown in FIG. 6 is located at a meshing position.

Figure 8:
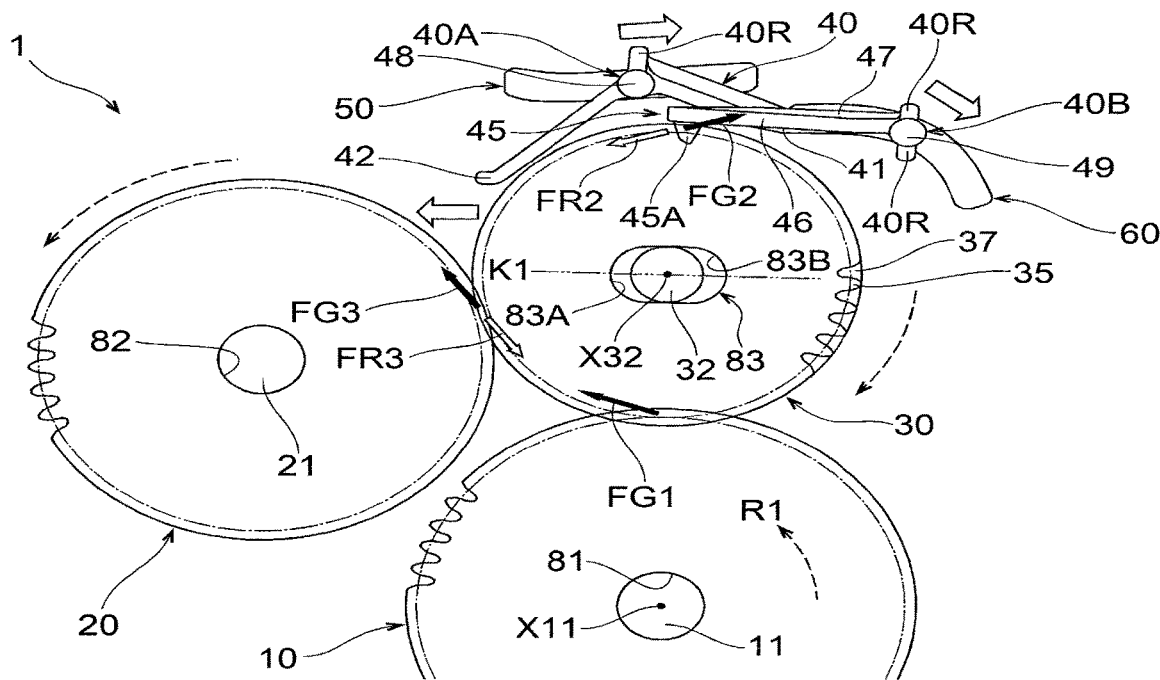
FIG. 8 is a schematic front view illustrating the planetary gear and the contact member which move from a state shown in FIG. 5 to a state shown in FIG. 6.

As shown in FIG. 8, as the second shaft 32 moves from the other end 83B to the one end 83A of the planetary gear guide 83, the second tooth portion 35 of the planetary gear 30 starts meshing with the driven gear 20 and increases gradually the meshing depth with the driven gear 20.

Figure 9:
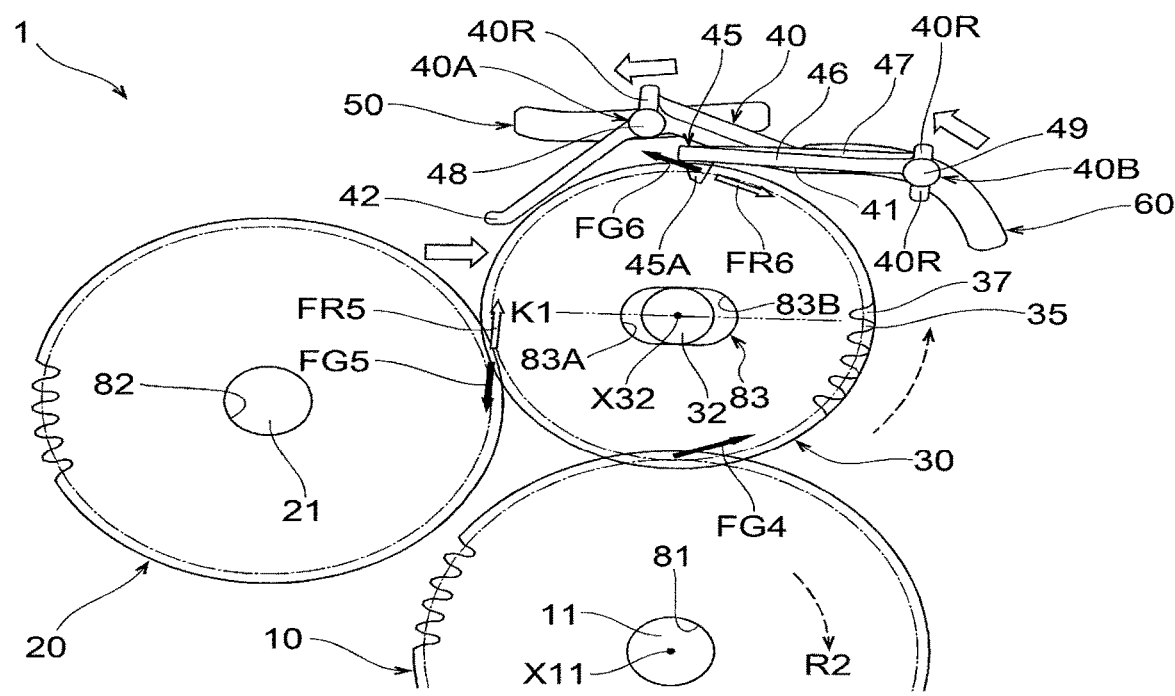
FIG. 9 is a schematic front view illustrating the planetary gear and the contact member which move from a state shown in FIG. 6 to a state shown in FIG. 5.
Figure 10:
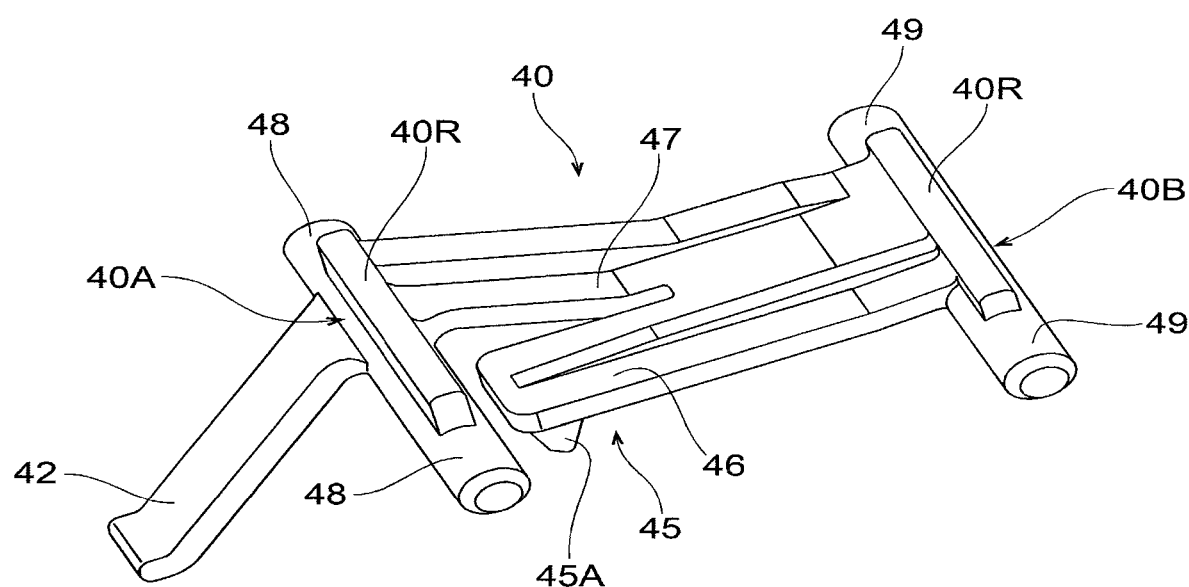
FIG. 10 is a perspective view of the contact member.
Figure 11:
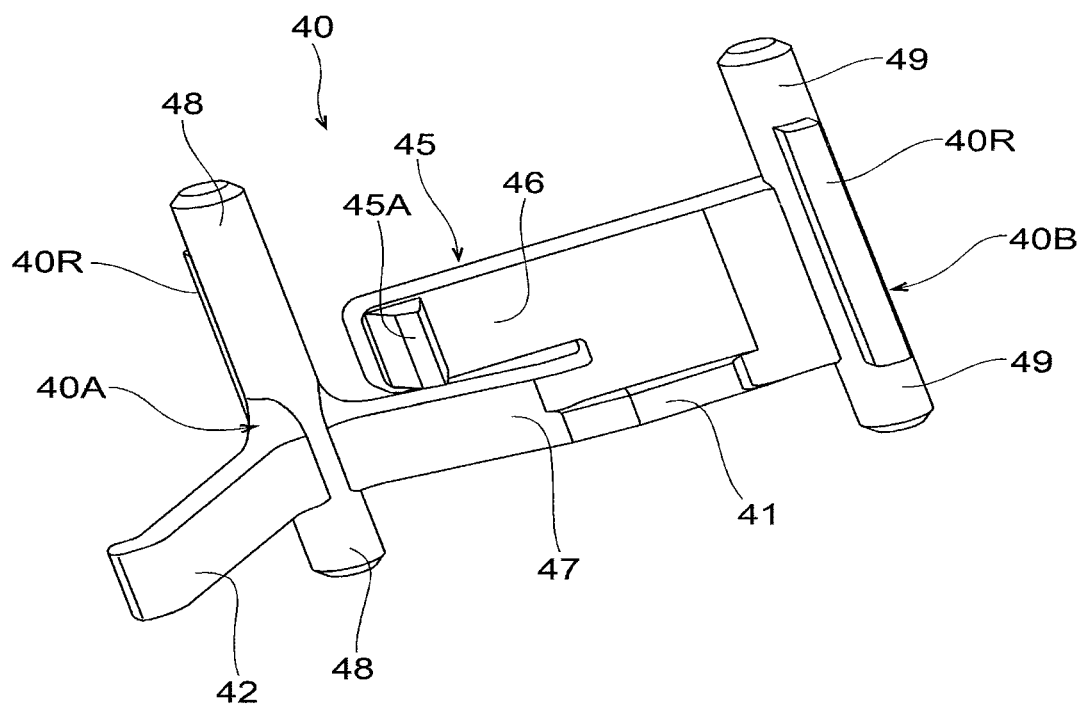
FIG. 11 is a perspective view of the contact member.

As shown in FIG. 9, as the second shaft 32 moves from the one end 83A to the other end 83B of the planetary gear guide 83, the second tooth portion moves away from the driven gear 20 while decreasing gradually the meshing depth with the driven gear 20.

As shown in FIGS. 2 and 4-6, the first guide 50 is a through groove penetrating each of the first frame 91 and the second frame 92. The second guide 60 is also a through groove penetrating each of the first frame 91 and the second frame 92.

As shown in FIG. 2, when viewed in the direction along the first shaft 11, an imaginary line K1 passes through the second axis X32 (X32A) of the second shaft 32 of the planetary gear 30 located at the meshing position, and the second axis X32 (X32B) of the second shaft 32 of the planetary gear 30 located at the farthest position. The imaginary line K1 extends along a direction in which the planetary gear 30 moves.

When viewed in the direction along the first shaft 11, each first guide 50 is opposite to the sun gear 10 relative to the imaginary line K1 and is entirely offset from the planetary gear 30. Each first guide 50 extends obliquely relative to the imaginary line K1 such that a closer portion thereof to the driven gear 20 is closer to the imaginary line K1, and a further closer portion thereof to the driven gear 20 is bent away from the imaginary line K1.

When viewed in the direction along the first shaft 11, each second guide 60 is opposite to the sun gear 10 relative to the imaginary line K1, and is farther from the driven gear 20 than the first guide 50, and is entirely offset from the planetary gear 30. Each second guide 60 is curved such that a farther portion thereof from the driven gear 20 is closer to the imaginary line K1.

As shown in FIGS. 5, 7, 10, and 11, the contact member 40 is integrally molded from resin in this embodiment. A first slide shaft 48 is integrally formed with one end 40A of the contact member 40 closer to the driven gear 20. A second slide shaft 49 is integrally formed with the other end 40B of the contact member 40 farther from the driven gear 20. Each of the first slide shaft 48 and the second slide shaft 49 is a cylindrical shaft extending in parallel with the first shaft 11.

The first slide shaft 48 at the one end 40A of the contact member 40 protrudes toward the first frame 91 and the second frame 92. The second slide shaft 49 at the other end 40B of the contact member 40 protrudes toward the first frame 91 and the second frame 92.

The first slide shaft 48 is inserted in the first guide 60 in each of the first frame 91 and the second frame 92, and the second slide shaft 49 is inserted in the second guide 60 in each of the first frame 91 and the second frame 92, such that the contact member 40 is movably supported by the frame 90.

The first guides 50 guide the one end 40A of the contact member 40 while the second guides 60 guide the other end 40B of the contact member 40. This allows the contact member 40 to move toward and away from the driven gear 20 while changing the orientation.

Each of the one end 40A and the other end 40B of the contact member 40 includes one or more ribs 40R. The rib 40R extends on each of the first slide shaft 48 and the second slide shaft 49 in the direction along the first shaft 11. Each rib 40R face the first frame 91 and second frame 92 while leaving a small clearance, thereby preventing the contact member 40 from rattling in the direction along the first shaft 11.

The contact member 40 includes a first tooth portion 45, a cantilever 46, a joint 47, a first contact portion 41, and a second contact portion 42.

The first tooth portion 45 includes a tooth 45A. The cantilever 46 is an example of a beam. The cantilever 46 protrudes in a cantilever manner from the other end 40B toward the one end 40A of the contact member 40. The cantilever 46 extends in a direction along the imaginary line K1. The cantilever 46 holds the first tooth portion 45. The tooth 45A of the first tooth portion 45 protrudes from a free end of the cantilever 46 toward the second tooth portion 35 of the planetary gear 30.

The cantilever 46 is elastically deformable in a radial direction of the planetary gear 30. When the contact member 40 moves toward and away from the driven gear 20, the second guide 60 having a curved shape maintains the tooth 45A protruding toward the second shaft 32 of the planetary gear 30.

The joint 47 connects the first slide shaft 48 and the second slide shaft 49 of the contact member 40, and extends in the direction along the imaginary line K1. Specifically, as shown in FIG. 5, the joint 47 extends in a direction along the imaginary line K1 and a portion thereof closer to the driven gear 20 extends away from the imaginary line K1. Thus, the first slide shaft 48 is farther from the imaginary line K1 than the second slide shaft 49. The joint 47 and the cantilever 46 are offset from each other in the direction along the first shaft 11. The first contact portion 41 is closer to the second frame 92 than the cantilever 46, and extends from the joint 47 toward the flange 37 of the planetary gear 30.

The second contact portion 42 is a substantially rod-like protrusion protruding from the one end 40A of the contact member 40 toward the driven gear 20.

As shown in FIG. 7, the tooth 45A of the first tooth portion 45 is disposed at such a position, in the direction along the first shaft 11, as to mesh with the second tooth portion 35 of the planetary gear 30. The first contact portion 41 is disposed at such a position, in the direction along the first shaft 11, as to contact the flange 37 of the planetary gear 30.

The second contact portion 42 is disposed on an extending line E1 which extends from the first contact portion 41 toward the driven gear 20. The second contact portion 42 is also disposed at such a position, in the direction along the first shaft 11, as to contact the flange 37 of the planetary gear 30. As shown in FIGS. 5 and 6, the first tooth portion 45 is closer to the driven gear 20 in the direction along the imaginary line K1 than the first contact portion 41.

Operation and Effect

In the gear transmission device 1 according to the embodiment, the contact member 40 interacts with the first guides 50 and the second guides 60, as described below, and causes the planetary gear 30 to move between the meshing position shown in FIG. 6 and the farthest position shown in at least FIG. 5. The first guide 50 and the second guide 60 formed in the first frame 91 have the same structure as those formed in the second frame 92. Thus, only the first guide 50 and the second guide 60 formed in either of the first frame 91 and the second frame 92 will be described below.

As shown in FIG. 6, when the planetary gear 30 is at the meshing position, the first guide 50 and the second guide 60 guide the contact member 40 such that the tooth 45A of the first tooth portion 45 is away from the second tooth portion 35 of the planetary gear 30 and that the first contact portion 41 is away from the flange 37 of the planetary gear 30.

An imaginary line K2 passes through the second axis X32 (X32A) of the second shaft 32 of the planetary gear 30 at the meshing position, and the first axis X11. As shown in FIG. 6, the second contact portion 42 is on the same side as the driven gear 20 relative to the imaginary line K2, and the tooth 45A of the first tooth portion 45 and the first contact portion 45 are opposite to the driven gear 20 relative to the imaginary line K2.

In this case, the second contact portion 42 is elastically in contact with the flange 37 of the planetary gear 30. A second urging force F42 of the second contact portion 42 to the planetary gear 30 is set to be small enough for the contact member 40 not to shift from the position shown in FIG. 6.

In contrast, as shown in FIG. 5, when the planetary gear 30 is at the farthest position, the first guide 50 and the second guide 60 guide the contact member 40 such that the first contact portion 41 is in contact with the flange 37 of the planetary gear 30 and that the tooth 45A of the first tooth portion 45 is away from the second tooth portion 35 of the planetary gear 30.

An imaginary line K3 passes through the second axis X32 (X32B) of the second shaft 32 of the planetary gear 30 at the farthest position, and the first axis X11. As shown in FIG. 5, the first contact portion 41, the second contact portion 42, and the tooth 45A of the first tooth portion 45 are on the same side as the driven gear 20 relative to the imaginary line K3.

In this case, the joint 47 of the contact member 40 elastically urges the first contact portion 41 toward the flange 37. A first urging force F41 of the first contact portion 41 to the planetary gear 30 is set to be greater than the second urging force F42 of the second contact portion 42 to the planetary gear 30.

When the drive source M1 rotates in the forward direction and the sun gear 10 rotates in the first direction R1, in order for the image forming apparatus 9 to perform color printing, the planetary gear 30 moves from a state shown in FIG. 5 to a state shown in FIG. 8. As shown in FIG. 8, upon receipt of a pressing force FG1 from the gear teeth of the sun gear 10, the planetary gear 30 starts moving from the farthest position toward the meshing position. The planetary gear 30 rotates in a clockwise direction shown in FIG. 8.

The contact member 40 is guided by the first guide 50 and the second guide 60 such that the tooth 45A of the first tooth portion 45 meshes with the second tooth portion 35 of the planetary gear 30. The contact member 40 receives a pressing force FG2 from the second tooth portion 35. This pressing force FG2 causes the contact member 40 to move in a direction opposite to the moving direction of the planetary gear 30 around the sun gear 10, i.e., in a direction away from the driven gear 20, thereby switching the first contact portion 41 to a state away from the flange 37 of the planetary gear 30.

In this case, a small friction force is generated between the first slide shaft 48 of the contact member 40 and the first guide 50, and between the second slide shaft 49 and the second guide 60. In addition, a small friction force is generated between the flange 37 of the planetary gear 30 and the first contact portion 41. Thus, a reaction force FR2 to press the planetary gear 20 toward the meshing position is applied from the first tooth portion 45 of the contact member 40 to the second tooth portion 35 of the planetary gear 30.

A reaction force FR3 against the pressing force FG3 that the driven gear 20 receives from the second tooth portion 35 of the planetary gear 30 is applied to the planetary gear 30. However, the reaction force FR2 and the pressing force FG1 are sufficiently greater than a component, in a direction opposite to the moving direction of the planetary gear 30 around the sun gear 10, of the reaction force FR3.

Thus, the planetary gear 30 moves smoothly to the meshing position shown in FIG. 6 while receiving the reaction force FR2 and the pressing force FG1.

The first guide 50 is inclined and bent in shape such that the tooth 45A of the first tooth portion 40 of the contact member 40 maintains in mesh with the second tooth portion 35 of the planetary gear 30 until immediately before the planetary gear 30 reaches the meshing position shown in FIG. 6, and that the tooth 45A moves away from the second tooth portion 35 upon arrival of the planetary gear 30 at the meshing position. In this case, the second slide shaft 49 of the contact member 40 is located at a curved portion of the second guide 60, and the cantilever 46 of the contact member 40 is inclined relative to the imaginary line K2.

Upon arrival of the planetary gear 30 at the meshing position shown in FIG. 6, the tooth 45A of the first tooth portion 45 released away from the second tooth portion 35 of the planetary gear 35, and the first contact portion 41 released away from the flange 37 of the planetary gear 30 do not affect the drive load.

The sun gear 10 continues to rotate in the first direction R1 after the planetary gear 30 reaches the meshing position shown in FIG. 6. Thus, the gear transmission device 1 transmits the drive force of the drive source M1 to the second transmitter G2 via the driven gear 20. In this case, the drive force of the drive source M1 is also transmitted, via the rotation direction adjusting mechanism G3, to the first transmitter G1. As a result, all the developing rollers 5E rotate for color printing.

When the drive source M1 rotates in the reverse direction and the sun gear 10 rotates in the second direction R2, in order for the image forming apparatus 9 to perform monochrome printing, the planetary gear 30 moves from a state shown in FIG. 6 to a state shown in FIG. 9. As shown in FIG. 9, the planetary gear 30 receives a pressing force FG4 from the gear teeth of the sun gear 10. When the planetary gear 30 attempts to rotate in a counterclockwise direction shown in FIG. 9, the driven gear 20 in mesh with the second tooth portion 35 of the planetary gear 30 is less likely to rotate due to a load of the second transmitter G2. Thus, a reaction force FR5 against a pressing force FG5 that the driven gear 20 receives from the second tooth portion 35 is applied to the planetary gear 30. The planetary gear 30 is repelled from the driven gear 20 due to the reaction force FR5 and the pressing force FG4, and starts moving toward the farthest position.

The contact member 40 is guided by the first guide 50 and the second guide 60 such that the second contact portion 42 moves away from the flange 37.

Subsequently, the contact member 40 is guided by the first guide 50 and the second guide 60 such that the tooth 45A of the first tooth portion 45 meshes with the second tooth portion 35. The contact member 40 receives the pressing force FG6 from the second tooth portion 35 of the planetary gear 30. This pressing force FG6 causes the contact member 40 to move in a direction opposite to the moving direction of the planetary gear 30 around the sun gear 10, i.e., in a direction toward the driven gear 20, thereby switching the first contact portion 41 to a state in contact with the flange 37 of the planetary gear 30.

In this case, a small friction force is generated between the first slide shaft 48 of the contact member 40 and the first guide 50, and between the second slide shaft 49 and the second guide 60. In addition, a small friction force is generated between the flange 37 of the planetary gear 30 and the first contact portion 41. Thus, a reaction force FR6 to press the planetary gear 30 toward the farthest position is applied from the first tooth portion 45 of the contact member 40 to the second tooth portion 35 of the planetary gear 30.

The inclined portion of the first guide 50 extends obliquely relative to the imaginary line K1 such that a closer portion to the driven gear 20 is closer to the imaginary line K1. When the inclined portion guides the first slide shaft 48, the cantilever 46 of the contact member 40 deforms gradually greatly. The first tooth portion 45 of the contact member 40 properly meshes with the second tooth portion 35 of the planetary gear 30, thereby properly applying the reaction force FR6 to the second tooth portion 35. The bent portion of the first guide 50 is bent away from the imaginary line K1. Immediately before the planetary gear 30 reaches the farthest position shown in FIG. 5, the bent portion guides the first slide shaft 48 so as to release the deformed cantilever 46 all at once. The first tooth portion 45 of the contact member 40 is properly released from the second tooth portion 35 of the planetary gear 30.

This allows the planetary gear 30 to move smoothly to the farthest position shown in FIG. 5 while receiving the reaction force FR6 and the pressing force FG4.

The first guide 50 is inclined and bent in shape such that the tooth 45A of the first tooth portion 40 of the contact member 40 maintains in mesh with the second tooth portion 35 of the planetary gear 30 until immediately before the planetary gear 30 reaches the farthest position shown in FIG. 5, and that the tooth 45A moves away from the second tooth portion 35 upon arrival of the planetary gear 30 at the farthest position. In this case, the second slide shaft 49 of the contact member 40 is located at a substantially parallel portion of the second guide 60 with the imaginary line K1, and the cantilever 46 of the contact member 40 is substantially parallel with the imaginary line K1.

The second guide 60 is curved in shape such that the tooth 45A of the first tooth portion 40 of the contact member 40 maintains protruding toward the second shaft 32 until immediately before the planetary gear 30 reaches the farthest position shown in FIG. 5.

Upon arrival of the planetary gear 30 at the farthest position shown in FIG. 5, the first contact portion 41 contacts the flange 37 of the planetary gear 30 with the urging force F41, thereby maintaining the planetary gear 30 at the farthest position shown in FIG. 5. The first tooth portion 45 released away from the second tooth portion 35 does not affect the drive load.

The sun gear 10 continues to rotate in the second direction R2 after the planetary gear 30 reaches the farthest position shown in FIG. 5. Thus, the gear transmission device 1 blocks transmission of the drive force from the drive source M1 to the second transmitter G2. In this case, the drive force of the drive source M1 is transmitted to the first transmitter G1 via the rotation direction adjusting mechanism G3. This allows the developing roller 5E for the black color to rotate for monochrome printing.

In the gear transmission device 1, the planetary gear 30 is not pressed, by an urging force exerted in a direction parallel with the first shaft 11, toward the first frame 91 and the second frame 92. This may greatly reduce a friction force generated between the planetary gear 30 and the frame 90.

Thus, the drive load may be reduced in the gear transmission device 1 according to the above-described embodiment. Also, the image forming apparatus 9 including the gear transmission device 1 may prevent or reduce noise and thus reduce power consumption.

In addition, assembly of the gear transmission device 1 may be readily automated as described below. Specifically, after the planetary gear 30 is assembled, using a robot arm or the like, into the meshing position shown in FIG. 6 of the second frame 92 placed substantially horizontally, the contact member 40 is temporarily assembled to the second frame 92 such that the first tooth portion 45 and the first contact portion 41 are away from the planetary gear 30. In this state, upon contact of the second contact portion 42 of the contact member 40 with the flange 37 of the planetary gear 30 at the meshing position, the contact member 40 is temporarily assembled into a proper position of the second frame 92. Finally, the first frame 91 is assembled to the second frame 92, thereby completing the assembly of the gear transmission device 1.

The assembled gear transmission device 1 is mounted to the image forming apparatus 9 in an orientation shown in FIG. 6 or in an orientation rotated clockwise or counterclockwise from the orientation shown in FIG. 6. When the gear transmission device 1 is mounted to the image forming apparatus 9 in an orientation rotated counterclockwise by 90 degrees from the orientation shown in FIG. 6, the first guide 50 and the second guide 60 extend vertically. In this case, the contact member 40 is prevented from dropping along the first guide 50 and the second guide 60 by bringing the second contact portion 42 of the contact member 40 into contact with the flange 37 of the planetary gear 30 at the meshing position.

This may facilitate assembly of the gear transmission device 1 and widen adoption of the planetary gear 30 and the contact member 40 by eliminating the limits on the orientation of the planetary gear 30 and the contact member 40 to be mounted to the image forming apparatus 9. The second contact portion 42 is configured to not contact the first frame 91 nor the second frame 92, thereby simplifying the frame 90.

The first urging force F41 of the first contact portion 41 to the planetary gear 30 is set to be greater than the second urging force F42 of the second contact portion 42 to the planetary gear 30. As the second urging force F42, a relatively small urging force may be sufficient to facilitate temporary assembly of the contact member 40 to the frame 90. This may reduce an increase in the drive load caused by a contact of the second contact portion 42 with the flange 37 of the planetary gear 30.

In the gear transmission device 1, when the planetary gear 30 moves from the meshing position shown in FIG. 6 to the farthest position shown in FIG. 5, the second contact portion 42 moves away from the flange 37 of the planetary gear 30 before the tooth 45A of the first tooth portion 45 meshes with the second tooth portion 35. This may reduce close to zero an increase in the drive load caused by a contact of the second contact portion 42 with the flange 37 of the planetary gear 30 during the movement of the planetary gear 30 from the meshing position to the farthest position.

In the gear transmission device 1, the first tooth portion 45 of the contact member 40 meshes with the second tooth portion 35, and the first contact portion 41 of the contact member 40 contacts the flange 37 of the planetary gear 30. This may reduce noise more effectively than when the first contact portion 41 is designed to contact the second tooth portion 35 of the planetary gear 30.

In the gear transmission device 1, as shown in FIG. 7, the second contact portion 42 is disposed on the extending line E1 which extends from the first contact portion 41 toward the driven gear 20. The second contact portion 42 also contacts the flange 37 of the planetary gear 30. This may reduce noise more effectively than when the second contact portion 42 is designed to contact the second tooth portion 35 of the planetary gear 30.

As shown in FIG. 2, when viewed in the direction along the first shaft 11 in the gear transmission device 1, the first guide 50 extends obliquely such that a portion thereof closer to the driven gear 20 is closer to the imaginary line K1 and an end portion thereof is bent away from the imaginary line K1. Because of this first guide 50, the first tooth portion 45 of the contact member 40 maintains in mesh with the second tooth portion 35 of the planetary gear 30 until immediately before the planetary gear 30 reaches the farthest position shown in FIG. 5, and the first tooth portion 45 moves away from the second tooth portion 35 upon arrival of the planetary gear 30 at the farthest position. The first tooth portion 45 of the contact member 40 maintains in mesh with the second tooth portion 35 of the planetary gear 30 until immediately before the planetary gear 30 reaches the meshing position shown in FIG. 6, and the first tooth portion 45 moves away from the second tooth portion 35 upon arrival of the planetary gear 30 at the meshing position.

As shown in FIG. 2, when viewed in the direction along the first shaft 11 in the gear transmission device 1, the second guide 60 is curved such that a portion thereof farther from the driven gear 20 is closer to the imaginary line K1. Because of this second guide 60, when the planetary gear 30 moves between the meshing position shown in FIG. 6 and the farthest position shown in FIG. 5, the tooth 45A of the first tooth portion 45 is readily maintained protruding toward the second shaft 32. Thus, when the planetary gear 30 is located between the meshing position shown in FIG. 6 and the farthest position shown in FIG. 5, the tooth 45A of the first tooth portion 45 properly meshes with the second tooth portion 35, and thus the contact member 40 moves smoothly in a direction opposite to the moving direction of the planetary gear 30 around the sun gear 10.

In the gear transmission device 1, as shown in FIGS. 8 and 9, the cantilever 46 of the first tooth portion 45 is elastically deformable in the radial direction of the second shaft 32. The elastically deformable cantilever 46 allows the tooth 45A of the first tooth portion 45 to be in mesh with the second tooth portion 35 of the planetary gear 30 within a proper range of the meshing depth which may fluctuate.

In the gear transmission device 1, as shown in FIGS. 2 and 4, the first guide 50 is formed in each of the first frame 91 and the second frame 92 to guide the first slide shaft 48 of the contact member 40. The second guide 60 is also formed in each of the first frame 91 and the second frame 92 to guide the second slide shaft 48 of the contact member 40. This may prevent the contact member 40 from being inclined relative to the first shaft 11. Thus, the contact member 40 allows the planetary gear 30 to move more smoothly between the meshing position shown in FIG. 6 and the farthest position shown in FIG. 5.

While the disclosure has been described with reference to the specific embodiments, various changes, arrangements and modifications may be applied therein without departing from the spirit and scope of the disclosure.

Each first guide 50 and each second guide 60 penetrate the first frame 91 and the second frame 92 in the above-described embodiment. However, a guide not penetrating the frame, such as a groove with a bottom may be used.

The second contact portion 42 of the contact member 40 contacts the flange 37 of the planetary gear 30 located at the meshing position, in the above-described embodiment. However, the second contact portion 42 of the contact member 40 may contact a rib provided on the frame 90 when the planetary gear 30 is located at the meshing position. Alternatively, the second contact portion 42 of the contact member 40 may contact the rib provided on the frame 90 and the flange 37 of the planetary gear 30.

The first tooth portion 45 has the tooth 45A in the above-described embodiment. However, the first tooth portion 45 may have two or more teeth.

The first slide shaft 48 and the second slide shaft 49 are integral with each other in the above-described embodiment. However, the first slide shaft 48 and the second slide shaft 49 may be separate from each other and move in response to each other.

The first guide 50 and the second guide 60 are formed separately from each other in the above-described embodiment. However, the first guide 50 and the second guide 60 may be connected into a single groove.

What is claimed is:

1. A gear transmission device comprising:
   a frame;
   a sun gear supported by the frame rotatably about a first axis;
   a driven gear rotatably supported by the frame and spaced from the sun gear;
   a planetary gear supported by the frame rotatably about a second axis and movably around the sun gear between a meshing position at which the planetary gear is in mesh with the driven gear and a farthest position at which the planetary gear is spaced farthest from the driven gear,
   a contact member including a first tooth portion configured to mesh with the planetary gear, and a first contact portion configured to contact the planetary gear; and
   a guide formed in the frame and configured to guide the contact member,
   wherein the guide is configured to guide the contact member such that:
      when the planetary gear is at the meshing position, the first tooth portion and the first contact portion are away from the planetary gear;
      when the planetary gear is at the farthest position, the first contact portion is in contact with the planetary gear and the first tooth portion is away from the planetary gear; and
      when the planetary gear is between the meshing position and the farthest position, the first tooth portion moves in mesh with the planetary gear in a direction opposite to a moving direction of the planetary gear around the sun gear, and the first contact portion is switched between a state in contact with the planetary gear and a state away from the planetary gear.

2. The gear transmission device according to claim 1, wherein the contact member includes a second contact portion configured to contact the planetary gear when the planetary gear is at the meshing position.

3. The gear transmission device according to claim 2, wherein the second contact portion is configured to contact the planetary gear when the planetary gear is at the meshing position.

4. The gear transmission device according to claim 1, wherein the first contact portion is configured to apply to the planetary gear a first urging force, and the second contact portion is configured to apply to the planetary gear a second urging force which is less the first urging force.

5. The gear transmission device according to claim 3, wherein the guide is configured to guide the contact member such that when the planetary gear moves from the meshing position to the farthest position, the second contact portion moves away from the planetary gear before the first tooth portion meshes with the planetary gear.

6. The gear transmission device according to claim 2, wherein the planetary gear includes a second tooth portion including a plurality of teeth, and a flange rotatable integrally with the second tooth portion, and
   wherein the first tooth portion of the contact member is configured to mesh with the second tooth portion, and the second contact portion of the contact member is disposed on a line extending from the first contact portion toward the driven gear and is configured to contact the flange.

7. The gear transmission device according to claim 1, wherein the contact member includes a first slide shaft disposed at an end thereof closer to the driven gear, and a second slide shaft disposed at another end thereof farther from the driven gear, the first slide shaft and the second slide shaft extending in a direction along the first axis, and
   wherein the guide includes a first guide configured to guide the first slide shaft, and a second guide configured to guide the second slide guide.

8. The gear transmission device according to claim 7, wherein the contact member includes a beam configured to hold the first tooth portion, the beam extending, when viewed in a direction along the first axis, along an imaginary line passing through the second axis of the planetary gear located at the meshing position, and the second axis of the planetary gear located at the farthest position.

9. The gear transmission device according to claim 8, wherein the first tooth portion is closer to the driven gear in a direction along the imaginary line than the first contact portion.

10. The gear transmission device according to claim 8, wherein the contact member includes a joint connecting the first slide shaft and the second slide shaft and extending in a direction along the imaginary line, the joint including the first contact portion, and the joint and the beam being offset from each other in the direction along the first axis.

11. The gear transmission device according to claim 10,
wherein the planetary gear includes a second tooth portion including a plurality of teeth, and a flange rotatable integrally with the second tooth portion, and
wherein the first tooth portion of the contact member is configured to mesh with the second tooth portion, and the first contact portion of the contact member is configured to contact the flange.

12. The gear transmission device according to claim 8, wherein the first guide extends obliquely relative to the imaginary line such that a closer portion thereof to the driven gear is closer to the imaginary line, and a further closer portion thereof to the driven gear is bent away from the imaginary line.

13. The gear transmission device according to claim 8, wherein when viewed in the direction along the first axis, the second guide is bent such that a farther portion thereof from the driven gear is closer to the imaginary line.

14. The gear transmission device according to claim 1, wherein the first tooth portion is elastically deformable in a radial direction of the planetary gear.

15. The gear transmission device according to claim 1, wherein the frame includes a first frame and a second frame which face each other, and the guide is formed in each of the first frame and the second frame.

16. An image forming apparatus comprising:
a gear transmission device according to claim 1; and
an image forming unit configured to form an image on a sheet.

* * * * *

UNITED STATES PATENT AND TRADEMARK OFFICE
CERTIFICATE OF CORRECTION

PATENT NO. : 10,907,703 B2
APPLICATION NO. : 16/578456
DATED : February 2, 2021
INVENTOR(S) : Yoshiya Tomatsu Page 1 of 1

It is certified that error appears in the above-identified patent and that said Letters Patent is hereby corrected as shown below:

In the Claims

Column 13, Claim 1, Line 57 should read:
driven gear;

Column 14, Claim 4, Line 24 should read:
urging force which is less than the first urging force.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*